United States Patent [19]

Ando et al.

[11] Patent Number: 4,623,200
[45] Date of Patent: Nov. 18, 1986

[54] HYDRAULIC PRESSURE CONTROL VALVE RESPONDING TO LOAD

[75] Inventors: Masamoto Ando; Kiyonobu Nagamori, both of Toyota, Japan

[73] Assignee: Aisin Seiki Kabushiki Kaisha, Kariya, Japan

[21] Appl. No.: 738,785

[22] Filed: May 29, 1985

[30] Foreign Application Priority Data

Jun. 6, 1984 [JP] Japan .......................... 59-084728[U]

[51] Int. Cl.⁴ .............................................. B60T 8/22
[52] U.S. Cl. ..................................... 303/22 R; 303/56
[58] Field of Search ................ 188/195; 251/231, 235, 251/236, 243; 303/6 C, 22 R, 23 R, 56

[56] References Cited

FOREIGN PATENT DOCUMENTS

| | | | |
|---|---|---|---|
| 2427613 | 1/1975 | Fed. Rep. of Germany | 303/22 R |
| 2600813 | 7/1976 | Fed. Rep. of Germany | 303/22 R |
| 173727 | 12/1960 | Sweden | 303/56 |
| 2022206 | 12/1979 | United Kingdom | 303/22 R |

Primary Examiner—Duane A. Reger
Attorney, Agent, or Firm—Burns, Doane, Swecker and Mathis

[57] ABSTRACT

A hydraulic pressure control valve for use with two independent rear braking systems, for transmitting braking hydraulic pressure to wheel cylinders in two rear wheels of a vehicle through two independent pipings. The control valve has a pair of valves, a pair of parallel pistons disposed in a single housing, and an actuating mechanism for displacing the pistons according to vehicle load. The actuating mechanism consists of a lever capable of rocking in a plane, a spring member for applying a force corresponding to the vehicle load to the rocking end of the lever, a support pin having both ends fitted in two grooves that extend parallel to the axes of the pistons and are equidistant from these axes, an equalizer which comes into abutment with one end of each piston at its either end. The equalizer is supported on the pin such that it can rock about its recessed center.

4 Claims, 5 Drawing Figures

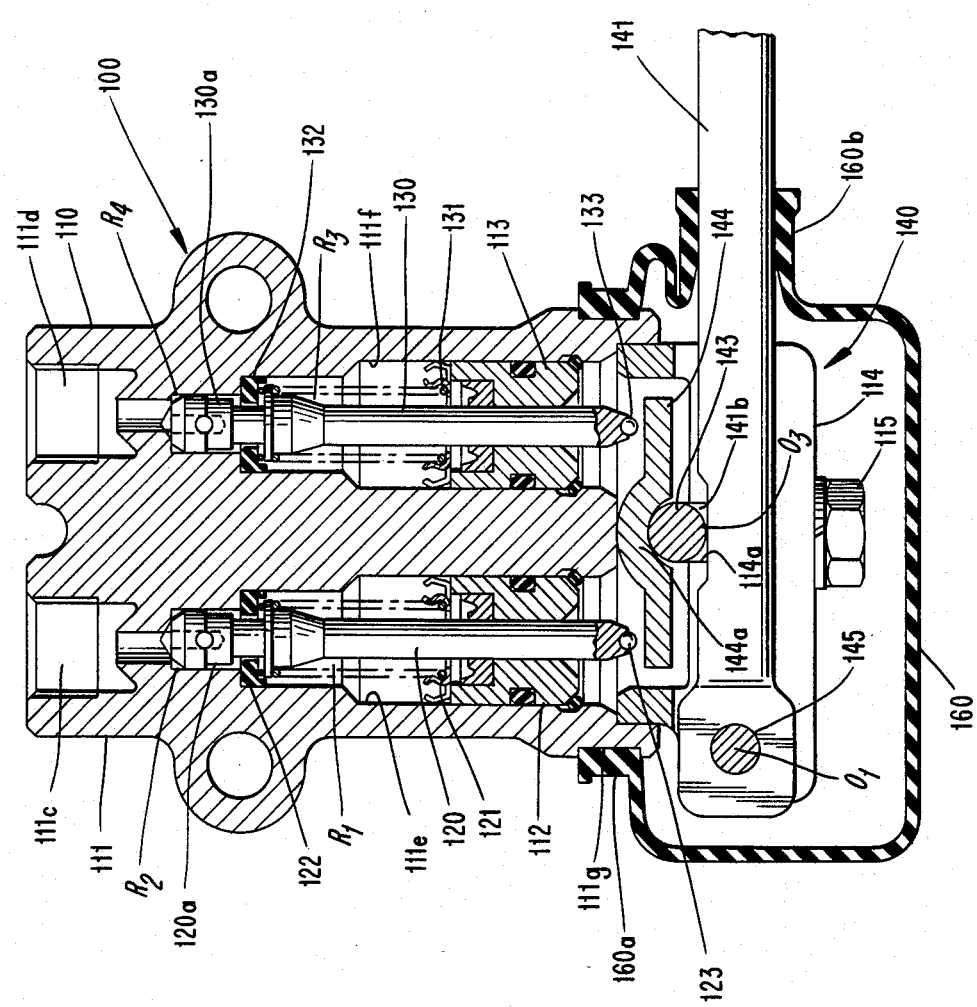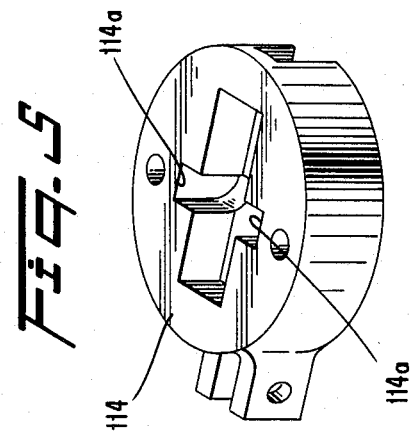

HYDRAULIC PRESSURE CONTROL VALVE RESPONDING TO LOAD

FIELD OF THE INVENTION

The present invention relates to a hydraulic pressure control valve responding to load and for use with two independent rear braking systems, for transmitting braking hydraulic pressure to wheel cylinders in the left and right rear wheels of a vehicle through two independent pipings.

BACKGROUND OF THE INVENTION

In a known hydraulic pressure control valve of this kind responding to load, a pair of pistons cooperates with a pair of valves to control the braking hydraulic pressure transmitted to the wheel cylinders, the pistons being mounted in a single housing in a parallel relation. One end of each piston protrudes from the housing in a liquid-tight manner so as to be axially slidable. The pistons are displaced toward their other ends by an actuating mechanism in response to the load carried by the vehicle.

The performance of this prior art hydraulic pressure control valve may vary from product to product or become unstable according to the structure of the aforementioned actuating mechanism. The hydraulic pressure control valve mentioned above is disclosed in, for example, Japanese Utility Model Laid-open Nos. 40060/1981 and 59655/1983 and U.S. Pat. No. 4,332,423.

SUMMARY OF THE INVENTION

In view of the foregoing, it is the main object of the present invention to provide a hydraulic pressure control valve having a stable performance which does not vary from product to product.

The above object is achieved by a hydraulic pressure control valve having a pair of valves, a pair of pistons, a single housing in which the pistons are mounted in a parallel relation, and an actuating mechanism for displacing the pistons, the actuating mechanism comprising: a lever mounted to a block mounted in the housing so as to be capable of rocking in the plane containing the axes of the pistons; a spring member for applying an actuating force corresponding to the vehicle load to the rocking end of the lever; a support pin having both ends fitted in a pair of guide grooves formed in the block such that the pin can slide, the grooves extending parallel to the axes of the pistons at an equal distance from the axes, the intermediate portion of the pin bearing on the intermediate portion of the lever; and an equalizer having a curved recess at its center, the equalizer being supported on the support pin such that it can rock about the recess, the both ends of the equalizer coming into abutment with each one end of the pistons.

In the present invention, when the hydraulic pressure control valve is in operation, i.e., when the braking hydraulic pressure is controlled, an actuating force corresponding to the vehicle load is imparted to each one end of the pistons from the spring member via the lever, the support pin, and the equalizer.

In the hydraulic pressure control valve according to the invention, the lever is mounted to the block, which is mounted in the housing, such that the lever can make rocking motion in the plane containing the axes of the pistons. Both ends of the support pin are fitted in the guide grooves, which extend parallel to the axes of the pistons at an equal distance from these axes, in such a way that the pin can slide along the grooves. The intermediate portion of the pin bears on the intermediate portion of the lever. Therefore, even if the lever is swingably mounted to the block off the plane containing the axes of the pistons due to an error of manufacture or assembly operation, the point at which the lever bears on the suport pin substantially remains fixed. Thus, the lever ratio that is defined as the ratio of the distance between the center of rocking movement of the lever and the rocking end of the lever to the distance between the center of rocking movement and the point at which the lever acts on the support pin hardly varies.

Because both ends of the support pin are fitted in the guide grooves formed in the block such that the pin can make rocking movement, and because the intermediate portion of the pin bears on the intermediate portion of the lever, the force exerted by the lever causes the pin to smoothly slide in the grooves without inclining.

Further, the equalizer is supported on the support pin in such a way that it can rock about the center of the curved recess in the central portion of the equalizer. That is, the equalizer is kept in abutment with the pin on the line which is perpendicular to the plane containing the axes of the pistons and which is at the same distance from these axes, and the equalizer is supported so as to be swingable. Therefore, the distance between the center of swing of the equalizer and the point at which the equalizer bears on one of the pistons is equal to the distance between the center of swing of the equalizer and the point at which the equalizer bears on the other piston. In addition, the force imparted to the equalizer by the support pin is none other than the component of force pointing in the direction of the axes of the pistons. Consequently, the pistons receive forces of the same magnitude from the equalizer. The resistance that the pistons experience in making axial sliding movement will not change.

As thus far described, the lever ratio for the novel hydraulic pressure control valve hardly changes even in the presence of an error of manufacture or assembly operation. The support pin smoothly slides in the guide grooves without inclining. The pistons receive axial forces of the same magnitude from the equalizer. The resistance that the pistons undergo in making axial sliding movement does not change. These features are combined to render the performance uniform and stable.

BRIEF DESCRIPTION OF THE DRAWINGS

FIG. 4 is a fragmentary, enlarged longitudinal cross section of the hydraulic pressure control valve shown in FIG. 1; and FIG. 5 is a perspective view of the block shown in FIGS. 2-4.

DETAILED DESCRIPTION OF THE INVENTION

Figure 1:
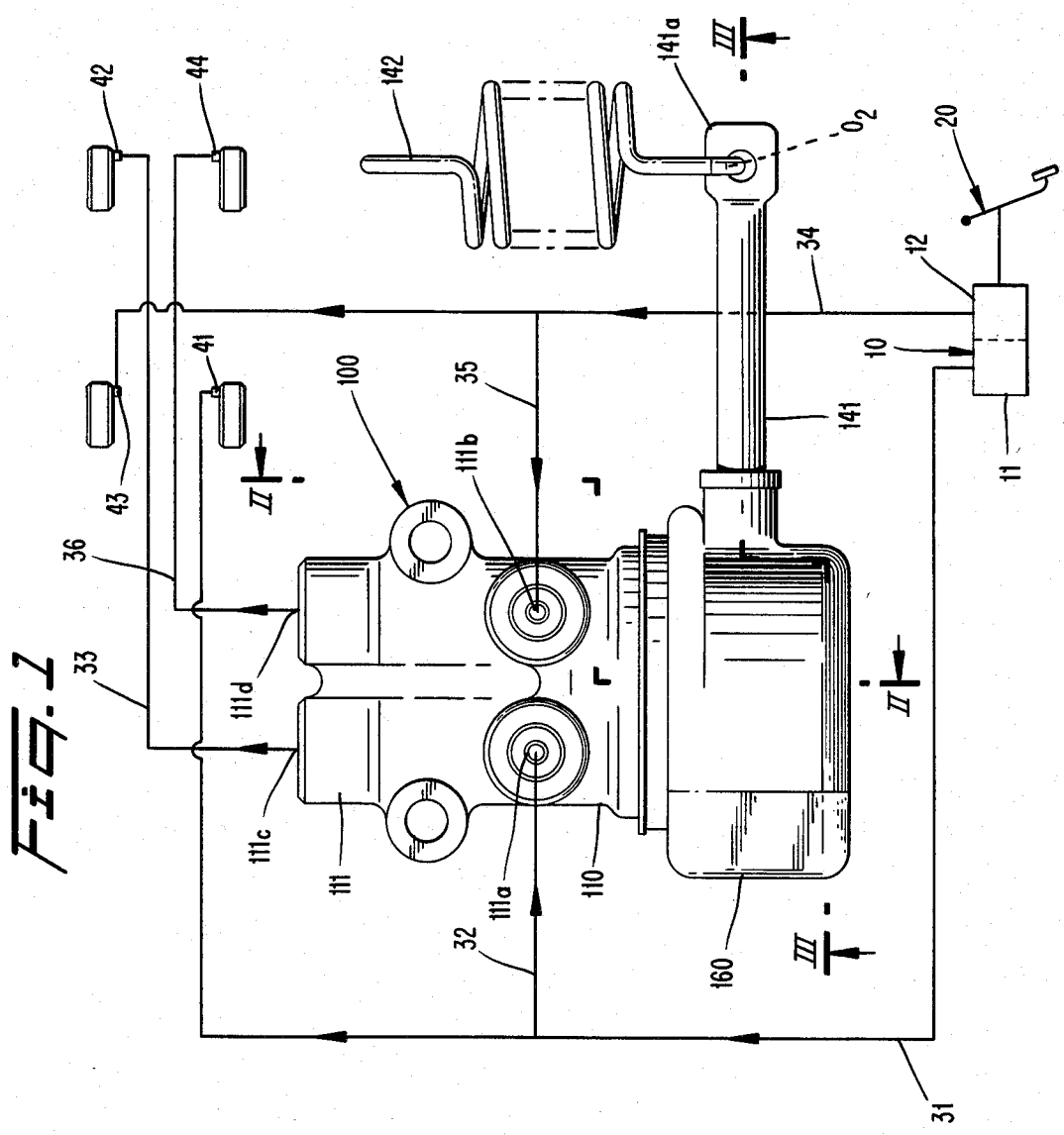
FIG. 1 is a schematic representation of a braking system including a hydraulic pressure control valve according to the present invention.
Figure 2:
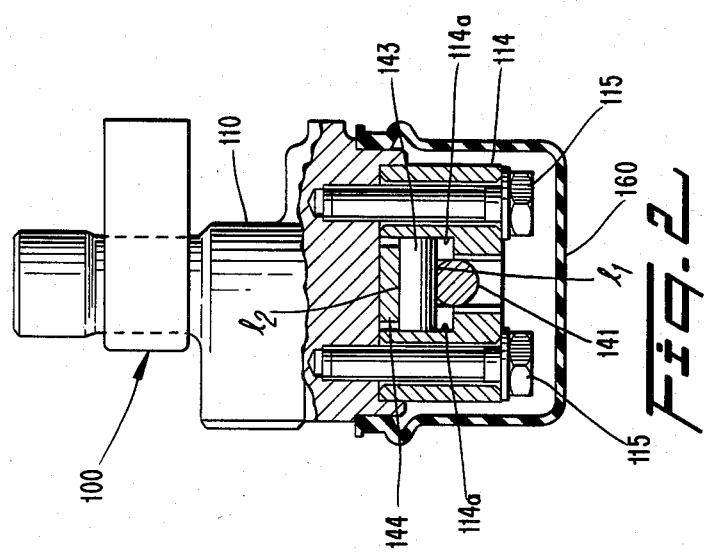
FIG. 2 is a cross-sectional view taken on line II—II of FIG. 1.
Figure 3:
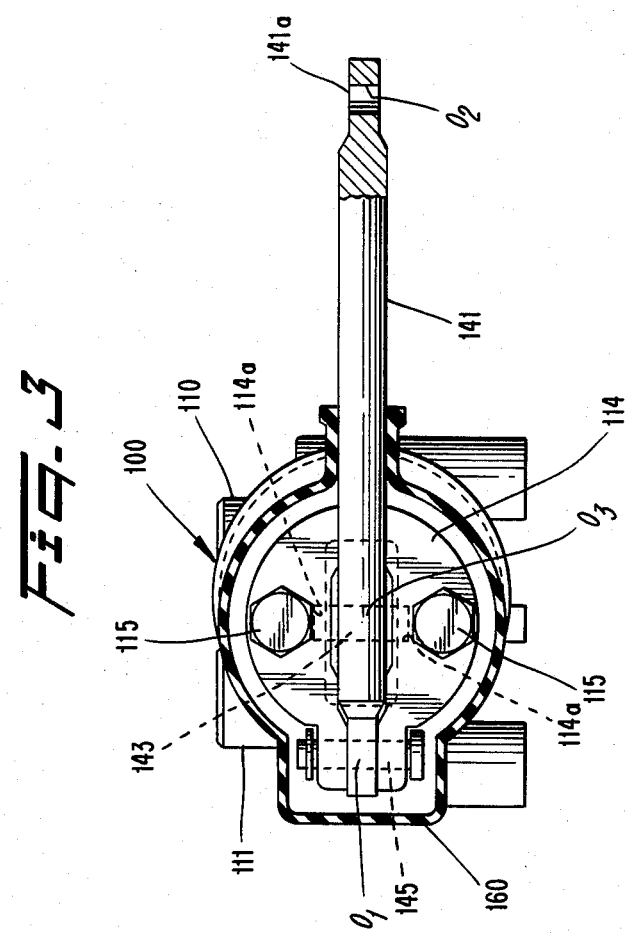
FIG. 3 is a cross-sectional view taken on line III—III of FIG. 1.

Referring to FIG. 1, two independent rear braking systems using a hydraulic pressure control valve according to the present invention are schematically shown. Generally indicated by reference numeral 100 is a hydraulic pressure control valve that operates in response to load. This valve 100 is disposed in the hydraulic pipeline which connects a master cylinder 10 to wheel cylinders 42, 44 in the left and right rear wheels of a vehicle.

The master cylinder 10 is a known tandem cylinder, and acts to produce equal hydraulic pressure in its independent pressurization chambers 11 and 12 according to the pressure applied to a brake pedal 20. The hydraulic pressure generated in one chamber 11 is transmitted to the wheel cylinder 41 in the left front wheel via a pipeline 31 and also to the wheel cylinder 42 in the right rear wheel via a pipeline 32, the hydraulic pressure control valve 100, and a pipeline 33, the pipeline 32 branching off from the pipeline 31. The hydraulic pressure produced in the other pressurization chamber 12 is transmitted to the wheel cylinder 43 in the left rear wheel via a pipeline 34 and also to the wheel cylinder 44 in the left rear wheel via a pipeline 35, the control valve 100, and a pipeline 36, the pipeline 35 branching off from the pipeline 34.

Referring to FIGS. 1-4, the hydraulic pressure control valve 100 has a housing 110, pistons 120 and 130 mounted in the housing 110, and an actuating mechanism 140. The housing 110 is mounted on a member installed on springs of the vehicle, and consists of the body 111 of the housing and a pair of sleeves 112 and 113. These sleeves are mounted to the body 111 in a liquid-tight manner. The body 111 is provided with a stepped hole 111e and another stepped hole 111f extending parallel to the hole 111e. A pair of inlet ports 111a and 111b, a pair of outlet ports 111c and 111d, an inlet port 111a, and an output port 111c are in communication with each other via the hole 111e. An inlet port 111b and an outlet port 111d are in communication with each other through the hole 111f. The inlet ports 111a and 111b are connected to the pipelines 32 and 35, respectively. The outlet ports 111c and 111d are connected to the pipelines 33 and 36, respectively.

The pistons 120 and 130 are mounted in the housing 110 in a parallel relation to each other. Coiled springs 121 and 131 exert the same force to urge the pistons 120 and 130 upward as viewed in the figure. These pistons are designed to be capable of being also displaced upwardly by the actuating mechanism 140. Annular valve seats 122 and 132 are mounted on the stepped portions of the holes 111e and 111f. The pistons 120 and 130 have valve stems 120a and 130a, respectively, which are seated on, or disengaged from, the valve seats 122 and 132, respectively, to make or break the connection between chambers R1 and R2 and the connection between chambers R3 and R4. The upper portions of the pistons are received in the stepped holes 111e and 111f so as to be axially slidable, while the lower ends extend through the sleeves 112 and 113 in a liquid-tight manner so as to be axially slidable. The chambers R1 and R3 are in communication with the inlet ports 111a and 111b, respectively. The chambers R2 and R4 are in communication with the outlet ports 111c and 111d, respectively. Balls 123 and 133 are firmly fixed to the lower ends of the pistons 120 and 130, respectively.

The actuating mechanism 140 is composed of a lever 141, a spring member 142 (see FIG. 1), a support pin 143, and an equalizer 144. The lever 141 is fitted in an opening formed at the lower end of the body 111 of the housing, and is so mounted to a block 114 by a pin 145 that it can rock in the plane containing the axes of the pistons 120 and 130. The block 114 is firmly held by means of two bolts 115. As can be seen from FIGS. 2 and 3, the block 114 prevents the lever 141 from swinging laterally, i.e., vertically as viewed in FIG. 3.

The spring member 142 serves to apply an actuating force corresponding to the load carried by the vehicle to the rocking end 141a of the lever 141. The spring member 142 is connected at its upper end to a member installed beneath springs, and is connected to the rocking end 141a of the lever 141 at its lower end. Both ends of the support pin 143 are fitted in a pair of guide grooves 114a such that the pin can slide. The grooves 114a are formed in the block 114, and extend parallel to the axes of the pistons 120 and 130 at a given distance from these axes. The lower end of the intermediate portion of the pin 143 bears on a flat surface 141b formed on the intermediate portion of the lever 141. The equalizer 144 is held to the pin 143 in such a way that it can swing about its curved recess formed in the central portion. Both ends of the equalizer 144 come into abutment with the lower ends of the pistons 120 and 130. When the hydraulic pressure control valve 100 is not in operation as shown in FIG. 4, the upper surface of the central portion of the equalizer 144 is in contact with the lower surface of the body 111 of the housing, and the equalizer is at a slight distance from the lower ends of the pistons 120 and 130. This distance is less than half the distance that is traveled by the valve stems 120a and 130a until they are seated on the valve seats 122 and 132. If the lower ends of the pistons 120 and 130 bore on the equalizer 144 under inoperative condition of the control valve 100, vibration produced by the running vehicle would rapidly wear and damage the contacted portions. The above structure prevents such an undesirable situation.

In the present example, a boot 160 having openings 160a and 160b is mounted on the lower end of the body 111 of the housing. The opening 160a fits in an annular groove 111g formed at the lower end of the body 111. The lever 141 extends through the opening 160b. The boot 160 protects the supported portion of the lever 141, the contact portions between the support pin 143 and the lever 141, the contact portions between the pin 143 and the equalizer 144, and the contact portions between the equalizer 144 and the pistons 120, 130 from mud, water, and dust. Since the boot 160 is fitted in the annular groove 111g in the housing body 111, it is easy to check the conditions of these supported portion and contact portions by taking the opening 160a out of the groove 111g.

In the operation of the structure constructed as described above, when a pressure is applied to the brake pedal 20, an equal hydraulic pressure is produced in the pressurization chambers 11 and 12 of the master cylinder 10. The hydraulic pressure created in the chamber 11 is transmitted to the wheel cylinder 41 through the pipeline 31 and also to the wheel cylinder 42 through the pipeline 32, the chambers R1 and R2 of the control valve 100, and the pipeline 33, whereby brakes are applied to the left front wheel and the right rear wheel. At the same time, the hydraulic pressure produced in the chamber 12 is transferred to the wheel cylinder 43 through the pipeline 34 and also to the wheel cylinder 44 through the pipeline 35, the chambers R3 and R4 of the control valve 100, and the pipeline 36. Thus, brakes are applied to the right front wheel and the left rear wheel.

As the brake pedal 20 is depressed, the hydraulic pressure produced in the pressurization chambers 11 and 12 of the master cylinder 10 increases proportionally until the pressure transmitted through the control valve 100 reaches a so-called break point. This point depends upon the area of the portions of the pistons 120 and 130 to which pressure is applied, upon the force of the coiled springs 121 and 131, upon the lever ratio, i.e., the ratio of the distance between the center O1 of rocking motion of the lever 141 and the rocking end 141a of the lever (i.e., the point O2 at which the force is applied) to the distance beween the center O1 of rocking motion and the point O3 at which the lever acts on the pin, and upon the characteristic of the spring member 142 which varies according to the load carried by the vehicle. Then, the pistons 120 and 130 move downward, seating the valve stems 120a and 130a on the valve seats 122 and 132. This temporarily breaks the communication between the chambers R1 and R2 and the communication between the chambers R3 and R4. However, as the pressure in the chambers R1 and R3 increases further, the valve stems 120a and 130a are moved away from the seats 122 and 132, thus re-establishing the communication between the chambers R1 and R2 and the communication between the chambers R3 and R4. The operation thus far described is repeated as the hydraulic pressure is increased to thereby exert control over the hydraulic pressure in a known manner.

If either the system of the hydraulic pressure control valve 100 containing the pipelines 31–33 or the system containing the pipelines 34–36 should be damaged, the actuating force of the actuating mechanism 140 would be totally applied to the piston 130 or 120 in the normal system during the aforementioned braking operation, making the break point higher than the normal hydraulic pressure. This would eliminate lack of braking force.

In the hydraulic pressure control valve 100 designed as described above, the lever 141 is mounted to the block 114 so as to be swingable in the plane containing the axes of the pistons 120 and 130, the block 114 being mounted to the housing body 111. The support pin 143 is slidably fitted in the guide grooves 114a at its both ends. The grooves 114a are formed in the block 114, and extend parallel to the axes of the pistons 120 and 130 at the same distance from these axes. The intermediate portion of the pin 143 bears on the flat surface 141b formed on the intermediate portion of the lever 141. Therefore, even if the lever 141 is swingably mounted on the block 114 off the plane containing the axes of the pistons 120 and 130 due to an error involved in manufacture or assembly operation, the point O3 at which the lever 141 bears and acts on the support pin 143 hardly varies. Consequently, the lever ratio hardly changes.

Both ends of the support pin 143 are fitted in the guide grooves 114a formed in the block 114 such that the pin can slide. The lever 141 abuts against the pin 143 on line l1 (see FIG. 2) containing the center of the pin 143. Therefore, it is unlikely that the force imparted by the lever 141 tilts the pin 143 within the grooves 114a. Thus, the pin 143 smoothly slides in the grooves 114a without inclining.

The equalizer 144 is supported on the support pin 143 such that it can swing about the center of the curved recess 144a of the central portion of the equalizer. That is, the equalizer 144 always swingably bears on the pin 143 on the line l2 (see FIG. 2) which is perpendicular to the plane containing the axes of the pistons 120 and 130 and which is at the same distance from these axes, although the lever 141 rocks. Therefore, the distance between the center of rocking motion l2 of the equalizer 144 and the point at which the equalizer bears on the piston 120 is equal to the distance between the center of rocking motion l2 and the point at which the equalizer bears on the piston 130. Note that the pistons are shown to be not in contact with the equalizer. Further, the force exerted on the equalizer 144 by the support pin 143 contains none other than the component of force pointing in the direction of the axes of the pistons 120 and 130. Consequently, the pistons 120 and 130 receive axial forces of the same magnitude from the equalizer 144. Hence, the pistons 120 and 130 experience a constant resistance in making sliding motion in the direction of the axes.

In summary, the lever ratio defined for the hydraulic pressure control valve 100 hardly changes even in the presence of an error of manufacture or assembly operation as already mentioned. The support pin 143 can smoothly slide in the guide grooves 114a without inclining. The pistons 120 and 130 receive axial forces of equal magnitude from the equalizer 144. The resistance that the pistons 120 and 130 undergo in sliding axially does not change. These features are combined to make the performance uniform and stable.

In the above example, the valve stems 120a and 130a which cooperate with the valve seats 122 and 132 to open and close the valves are mounted integrally with the pistons 120 and 130. It is also possible to mount the valve stems independently of the pistons 120 and 130.

Also, in the above example, the present invention is applied to the hydraulic pressure control valve in which when the hydraulic pressure produced in the pressurization chambers 11 and 12 of the master cylinder 10 exceeds the so-called break point, the valve stems 120a and 130a of the pistons 120 and 130 are seated on and disengaged from the valve seats 122 and 132. However, the invention can also be applied to a hydraulic pressure control valve in which the valve stems remain seated on the valve seats when the hydraulic pressure is in excess of the so-called break point.

Further, in the above example, the housing 110 is mounted on the member installed on springs of the vehicle, and the upper end of the spring member 142 is connected to the member installed under springs of the vehicle. As a modified example, the housing 110 may be mounted to a member under springs of the vehicle, and the upper end of the spring member 142 may be connected to a member on springs of the vehicle.

What is claimed is:

1. In a hydraulic pressure control valve responding to load and for use with two independent rear braking systems for transmitting braking hydraulic pressure through two independent pipings to wheel cylinders mounted in the left and right rear wheels of a vehicle, the hydraulic pressure control valve having a single housing, a pair of valves, two pistons which cooperate with the valves to control the hydraulic pressure transmitted to the wheel cylinders and which are mounted in the housing in a parallel relation, and an actuating mechanism for displacing the pistons toward one end of each piston according to the load carried by the vehicle, the other end of each piston protruding from the housing in a liquid-tight manner so as to be axially slidable, the improvement wherein said actuating mechanism comprises: a lever mounted to a block mounted in the housing so as to be capable of making rocking motion in the plane containing the axes of the pistons; a spring member for applying an actuating force corresponding to the vehicle load to the rocking end of the lever; a support pin having both ends fitted in a pair of guide grooves formed in the block such that the pin can slide, the grooves extending parallel to the axes of the pistons at the same distance from the axes, the intermediate portion of the pin bearing on the intermediate portion of the lever; and an equalizer having a curved recess at its center, the equalizer being supported on the support pin such that it can rock about the recess, the both ends of the equalizer coming into abutment with one end of each piston.

2. In a hydraulic pressure control valve as set forth in claim 1, the further improvement wherein the lever is a rodlike member of circular cross section, and wherein the portion of the lever which bears on the support pin is flat.

3. In a hydraulic pressure control valve as set forth in claim 1, the further improvement wherein the block is fixed to the housing by means of a plurality of bolts which are screwed into the housing through holes formed in the block, and wherein the housing and the block are provided with a locating circular hole and a corresponding, locating annular portion, respectively.

4. In a hydraulic pressure control valve as set forth in claim 1, the further improvement wherein
   (A) the lever is a rodlike member of circular cross section,
   (B) the block is fixed to the housing by means of a plurality of bolts which are screwed into the housing through holes formed in the block,
   (C) the housing and the block are provided with a locating circular hole and a corresponding, locating annular portion, respectively,
   (D) the block, the support pin, the equalizer, and the lever are partially covered with a boot having first and second openings, the first opening fitting over the outer periphery of the outer wall of the circular hole in the housing in an airtight manner, the second opening fitting over the outer periphery of the lever of circular cross section in an airtight manner.

* * * * *